US008839456B2

(12) United States Patent
Ting

(10) Patent No.: US 8,839,456 B2
(45) Date of Patent: Sep. 16, 2014

(54) SYSTEM AND METHOD FOR DATA AND REQUEST FILTERING

(75) Inventor: David Ting, Sudbury, MA (US)

(73) Assignee: Imprivata, Inc., Lexington, MA (US)

( * ) Notice: Subject to any disclaimer, the term of this patent is extended or adjusted under 35 U.S.C. 154(b) by 9 days.

(21) Appl. No.: 13/033,132

(22) Filed: Feb. 23, 2011

(65) Prior Publication Data

US 2011/0145908 A1  Jun. 16, 2011

Related U.S. Application Data

(63) Continuation of application No. 10/395,049, filed on Mar. 21, 2003, now abandoned.

(51) Int. Cl.
*G06F 7/04* (2006.01)
*H04L 29/06* (2006.01)
*G06F 21/32* (2013.01)

(52) U.S. Cl.
CPC ............. *H04L 63/102* (2013.01); *G06F 21/32* (2013.01); *G06F 2221/2119* (2013.01)
USPC ................................................ 726/28; 726/2

(58) Field of Classification Search
USPC ....................................... 726/2, 28
See application file for complete search history.

(56) References Cited

U.S. PATENT DOCUMENTS

| | | | | |
|---|---|---|---|---|
| 5,423,043 A | * | 6/1995 | Fitzpatrick et al. | 719/317 |
| 5,544,317 A | * | 8/1996 | Berg | 709/235 |
| 5,805,892 A | * | 9/1998 | Nakajima | 717/131 |
| 5,996,011 A | * | 11/1999 | Humes | 709/225 |
| 6,205,480 B1 | * | 3/2001 | Broadhurst et al. | 709/225 |
| 6,286,001 B1 | * | 9/2001 | Walker et al. | 707/697 |
| 6,476,833 B1 | * | 11/2002 | Moshfeghi | 715/854 |
| 6,496,511 B1 | * | 12/2002 | Wang et al. | 370/401 |
| 6,671,818 B1 | * | 12/2003 | Mikurak | 714/4.21 |
| 6,745,367 B1 | * | 6/2004 | Bates et al. | 715/205 |
| 6,948,183 B1 | * | 9/2005 | Peterka | 725/25 |
| 2002/0026605 A1 | * | 2/2002 | Terry | 714/37 |
| 2002/0069243 A1 | * | 6/2002 | Raverdy et al. | 709/203 |
| 2002/0144119 A1 | * | 10/2002 | Benantar | 713/171 |
| 2002/0161766 A1 | * | 10/2002 | Lawson et al. | 707/9 |
| 2003/0023774 A1 | * | 1/2003 | Gladstone et al. | 709/328 |
| 2003/0153288 A1 | * | 8/2003 | Nakatsuyama | 455/130 |
| 2003/0154296 A1 | * | 8/2003 | Noguchi et al. | 709/229 |
| 2003/0191800 A1 | * | 10/2003 | Challenger et al. | 709/203 |
| 2004/0249922 A1 | * | 12/2004 | Hackman et al. | 709/223 |

OTHER PUBLICATIONS

Hadfield et al. (Lee Hadfield, Dave Hater, Dave Bixler, "Windows NT Server 4 Security Handbook", 1997, ISBN: 078971213), p. 63-86.*

* cited by examiner

*Primary Examiner* — Peter Poltorak
(74) *Attorney, Agent, or Firm* — Bingham McCutchen LLP

(57) ABSTRACT

Data and data requests of users of applications are filtered using a client-resident agent. A user profile may contain data pertaining to restrictions on content the user is permitted to view or types of requests the user is permitted to make, within one or more applications. Data in the user profile may be used to grant or deny access to applications, filter particular content from the user's view, or filter particular data requests made by the user.

23 Claims, 4 Drawing Sheets

SYSTEM AND METHOD FOR DATA AND REQUEST FILTERING

RELATED APPLICATION

This is a continuation of U.S. Ser. No. 10/395,049, filed on Mar. 21, 2003, the entire disclosure of which is hereby incorporated by reference.

FIELD OF INVENTION

The invention relates generally to filtering data and requests during the use of a computer system. More specifically, in one embodiment, the invention relates to systems and methods for using a client-resident agent to filter data to be presented and requests to be made during a user's usage of a computer system.

BACKGROUND

The number of computer applications used by large corporations has increased significantly over the past twenty years. For example, companies may employ separate applications for electronic mail, document control, financial applications, inventory management, manufacturing control and engineering functions, in addition to overall network access. Each application may, in turn, include numerous modules and screens, each with one or more functions. Due to numerous regulatory and business requirements, many applications include filtering features that block individual user access to particular data. However, each application often requires a separate administrative function to define, store, and distribute user privileges associated with the users.

From a management perspective, it is cumbersome to set filtering rules for each end user across the multiple systems and applications that the user may access, and then update these as necessary. Furthermore, the need to implement processes for each new application added by an organization is often repetitive of processes already in place for other applications. Indeed, the multitude of computer applications a user interacts with on a daily basis makes it both cumbersome and expensive to create and maintain a complete set of filtering rules for a user.

SUMMARY OF THE INVENTION

The present invention facilitates the filtering of data and data requests across multiple server and/or web-based applications. The functionality implementing the filtering is preferably resident on the user's client computer. The invention prevents the user from making an impermissible request, and further prevents the user from viewing impermissible data retrieved in response to a request. In this way, a user is allowed to make only authorized requests, and to view only data he is authorized to view.

Accordingly, in a first aspect, the invention comprises a method for controlling access to and/or requests for content provided to a user's computer. The method comprises identifying the user to a server, retrieving user requested data, monitoring the retrieved data, and filtering out particular requests and or/data based on the user's identity. In one embodiment of the invention, a user profile stored on the server specifies the filtering criteria and can also include a reference set of biometric data associated with the user. The user can input biometric data to the client for transmission to the server, where it is compared to the reference set of biometric data. The user's identification is authenticated if the two sets of data match. Access to user-requested data may be limited on a screen-by-screen or finer basis in accordance with filtering criteria.

In a second aspect, the invention comprises a system for monitoring and restricting access to user-requested information. The system includes a first server for storing a user profile including a predetermined set of user-specific content restrictions, and for transmitting the user profile to a client computer. The system also includes a second server for storing a reference set of biometric data and comparing biometric data received from a client computer to the stored reference set of biometric data. If the received set of biometric data matches the stored set of biometric data, the server sends the user profile to the client computer.

As an example, the data that can be stored in the user profile may include, in addition to filtering criteria, a password, user identification number, secure ID, or biometric data, and can be used to identify a user of the system. The system may further include a biometric input device whereby a user may, for example, present a fingerprint, retinal scan, or other biometric data to be sent to the server for authentication.

In one embodiment, an active agent resident on the client monitors data retrieved or requests made by the user. For example, the agent may monitor incoming data as it is presented on screens to the user, blocking display of particular screens according to the content restrictions in the user's profile. Alternatively or in addition, the agent may monitor outgoing requests made by the user, blocking the transmission of particular requests according to the content restrictions in the user's profile. Alternatively or in addition, the active agent may reside on an application server, where it monitors data to be sent to or requests made by the client.

Other aspects and advantages of the invention will become apparent from the following drawings, detailed description, and claims, all of which illustrate the principles of the invention, by way of example only.

BRIEF DESCRIPTION OF THE DRAWINGS

The above and further advantages of the invention may be better understood by referring to the following description taken in conjunction with the accompanying drawings, in which.

DETAILED DESCRIPTION

Figure 1:
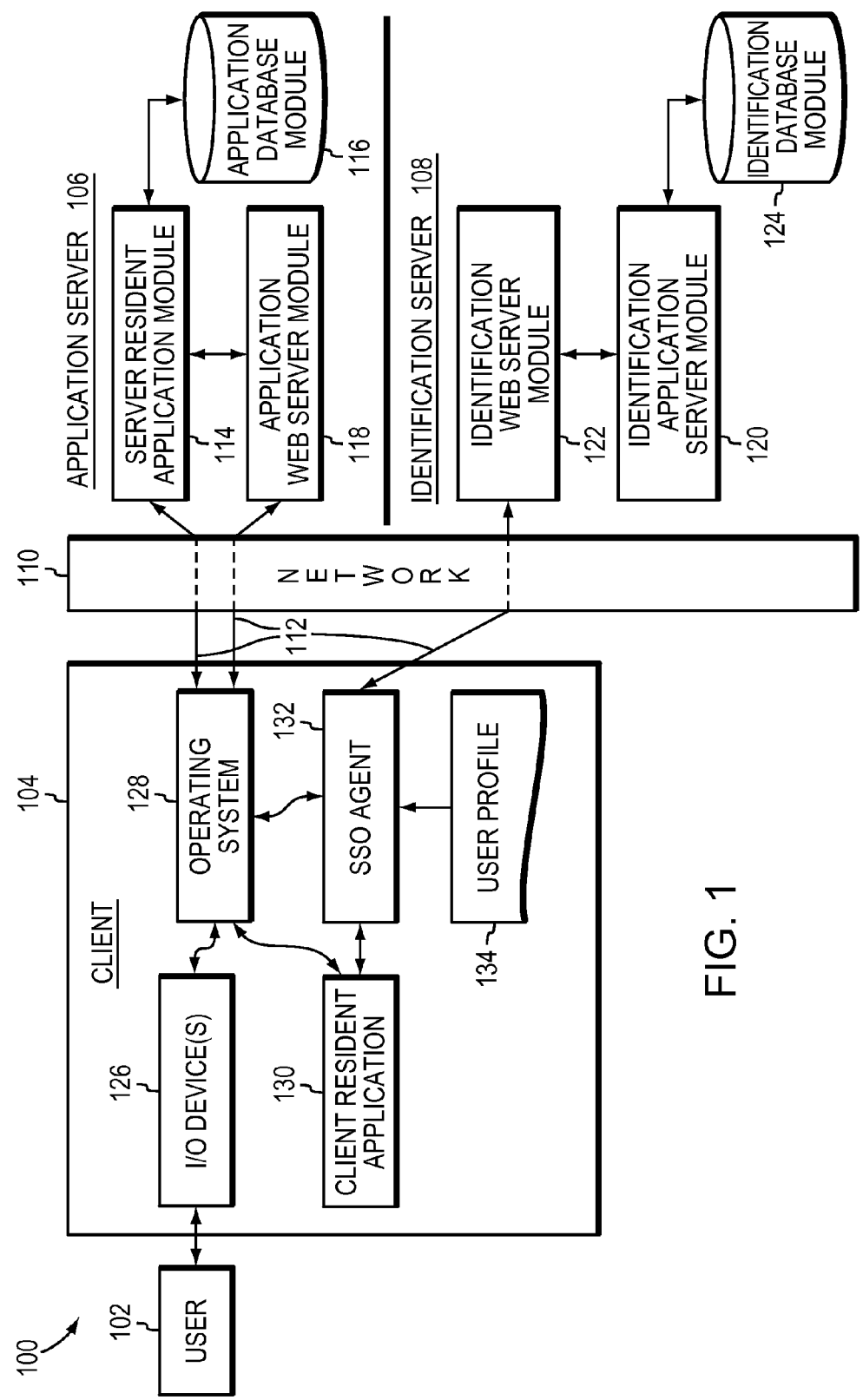
FIG. 1 is a block diagram of a system to authenticate a user and automate login to one or more applications using a client-resident user profile and an identification server in accordance with the invention.

In broad overview, FIG. 1 illustrates an embodiment of a system 100 to automate the login process to and to audit the user's activity within one or more applications in accordance with the invention. The system 100 includes a first computing system (a "client") 104, a second computing system (an "application server") 106 and a third computing system (an "identification server") 108, all in communication with a network 110. The client node 104 is used by one or more users, indicated graphically at 102. The client node 104, the application server 106 and the identification server 108 are in communication with the network 110 using communication channels 112.

For example, the communication channels 112 can connect the client 104 to a local-area network (LAN), such as a company intranet, a wide area network (WAN) such as the Internet, or the like. The client 104 and servers 106, 108 communicate with the network 110 through the communication channels 112 using any of a variety of connections including, for example, standard telephone lines, LAN or WAN links (e.g., T1, T3, 56 kb, X.25), broadband connections (ISDN, Frame Relay, ATM), wireless connections, and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 104 and the servers 106, 108 encrypt all communication when communicating with each other.

Each of the servers 106, 108 can be any computing device capable of providing the services requested by the client 104. Particularly, this includes logging into secure applications, tracking user activities within applications, and terminating a user's access to applications as described in more detail below.

The application server 106 includes one or more server-resident application modules 114 and one or more application database modules 116. The application server 106 may also include an application web server module 118 to facilitate communication with the client 104 over the network 110 where the communication network 110 is the Internet, an intranet, or the like. The identification server 108 includes an identification application server module 120, an identification web server module 122, and an identification database module 124. The modules throughout the specification can be implemented in whole or in part as a software program and/or a hardware device (e.g., ASIC, FPGA, processor, memory, storage and the like).

For purposes of illustration, FIG. 1 depicts an application server 106 as an entity separate and distinct from the identification server 108 and each server in independent communication with the network 110. It is to be understood, however, that the servers 106, 108 can also be implemented, for example, on a single server (e.g., as logically distinct modules), distributed on portions of several (i.e., more than two) servers, and/or as part of a single server node or server farm in communication with the network 110 through, for example, a single web server (not shown). It should further be understood that even if two logical servers are running in the same physical machine, they may be secured logically if any of the following conditions are met: (1) the servers run in different process spaces (so there is no possibility for one process to access the memory of another process); (2) the servers access different logical databases (which may be further partitioned) with different credential or entry requirements; (3) sensitive data in the application server 106 and the identification server 108 are encrypted using separate encryption keys; or (4) the server applications are launched (e.g., in a Unix environment) under two different logon accounts. For heightened security, it is possible to encrypt all the data used by the identification server 108 using a key maintained by the application server 106 or an external key server; this approach enhances security in that a breach of the of the identification server 108 and its database 124 would yield only encrypted data.

The client 104 can be any computing device (e.g., a personal computer, set top box, wireless mobile phone, handheld device, personal digital assistant, kiosk, etc) used to provide a user interface to access the application server 106. The client 104 includes one or more input/output devices 126 such as a keyboard, a mouse, a screen, a touch-pad, a biometric input device, and the like. The client 104 also includes an operating system 128. Operating systems supported by the client 104 can include any member of the WINDOWS family of operating systems from Microsoft Corporation. The client 104 may also include one or more client-resident applications 130, such as INTERNET EXPLORER developed by Microsoft Corporation, NETSCAPE NAVIGATOR developed by AOL Time Warner, or ATTACHMATE developed by Attachmate Corporation.

To use the system 100, a user 102 registers that user's authentication data for one or more applications with the application server 106. The authentication data can include, for example, a password, a user identification number, or biometric data associated with the individual's fingerprint(s), facial characteristics, voice, and the like. The system 100 stores authentication data identifying the user to the system (e.g., username, logon ID, employee ID and the like) in the application database module 116. The application database module 116 may also associate an alias with that stored data. For example, employee #2054 may be associated with the alias 719jLL01. As the user logs into an application 114 (residing on the application server 106) via the network 110, an active agent 132 residing on the client 104 captures the authentication data entered by the user 102 using one or more input devices 126 and transmits (or causes the transmission of) the authentication data to the identification web server module 122 residing on the identification server 108. The active agent 132 captures the data by, for example, monitoring a messaging queue for instructions sent to and from the operating system, intercepting HTTP requests sent to and from the network 110, capturing screen images sent to the output device(s) 126, as well as other methods. The identification web server module 122 provides the authentication data to the application server module 120, which in turn stores the data in the database module 124. The identification application server module 120 then retrieves the updated authentication data and sends it to the client 104 using the web server module 122 and the active agent 132. The authentication data is stored on the client 104 in the user profile 134 for future use by the active agent 132 residing on the client 104. Thereafter, as the user logs into an application in the usual fashion, the active agent 132 operates in the background, gathering and transmitting to the identification server 108 all the information necessary to automate subsequent logins.

Alternatively, or in addition, the active agent 132 may reside on a server. This embodiment is particularly useful in a "thin-client" environment, such as CITRIX METAFRAME. In this embodiment, a user 102 connects to a server where the active agent 132 resides. This server, in turn, communicates with the application server 106 and identification server 108. The displayed output (such as HTML or screen dumps, for example) is obtained indirectly from the application server 106, by way of the server on which the active agent 132 resides; that is, this additional server runs the active agent 132 and passes back the display information (as pixel values, markup code, or any other suitable display modality) to the client 104.

The user profile 134 can contain various data furthering the function of the invention, such as: a user identification code; an authentication modality (such as password, biometric data, or the like); an application profile (such as a user's rights and privileges within an application); an application credential for access (such as a user's password, a digital representation of biometric data, or the like); a data restriction profile (such as keywords, fields, types of requests, Uniform Resource Locators of web pages, application screens, application screen sequences, or the like); and audit records of a user's activities within an application. The active agent 132 can then use the data stored in the user profile 134 to determine which HTTP requests to intercept, to complete login screens with stored authentication data, and the like.

In the illustrated embodiment, there are security measures that the system 100 can use to ensure that a listening device does not capture this authentication data, or if the data is captured, that it is not usable by itself. For example, the active agent 132 can encrypt the alias and the biometric data independently; the active agent 132 and the identification database module 124 can communicate with each other using SSL and/or public and private keys; and/or the active agent 132 can transmit the alias and the authentication data independently to the identification database module 124.

The registration process can be initiated in several different ways. The responsible technology administrator may initiate the registration. For example, the administrator can have the user come to the administrator's client 104 or a secure client 104 used only for registration when the employee starts work, when a customer purchases services accessible via the application server 106, and the like. Alternatively, the application server 106 can initiate registration when the user first requests a service from the application server 106 requiring user authentication. The client 104 can display a graphical user interface ("GUI") leading the user through the registration process. The level of authentication of the user at registration may be selected by the administrators of the system 100 and can range, for example, from a user presenting the correct password to the application server 106 to a user being present in person in front of an administrator who can check the identification of the user.

Once the system 100 registers an individual, the identification application server module 120 creates an association between the data identifying the user to the identification system and the user's alias in the application database 116, and another association between the user's alias and the user's authentication data in the identification database module 124. Storing the two associations at locations separate from each other requires a breach in security of both the application database 116 and the identification database 124 to put authentication data together with some identifying data. For example, the first association may be stored in the application database module 116 residing on one physical server, while the second association may be stored in the identification database module 124, residing on a second physical server. Further, if the identifying data is just another unique identifier that does not reveal identity by itself, for example an employee number, then the security of a third database (not shown) containing the association between the employee number and the identity (e.g., name and address of the employee) would have to be breached to match the identity of the user with that individual's biometric data.

Figure 2:
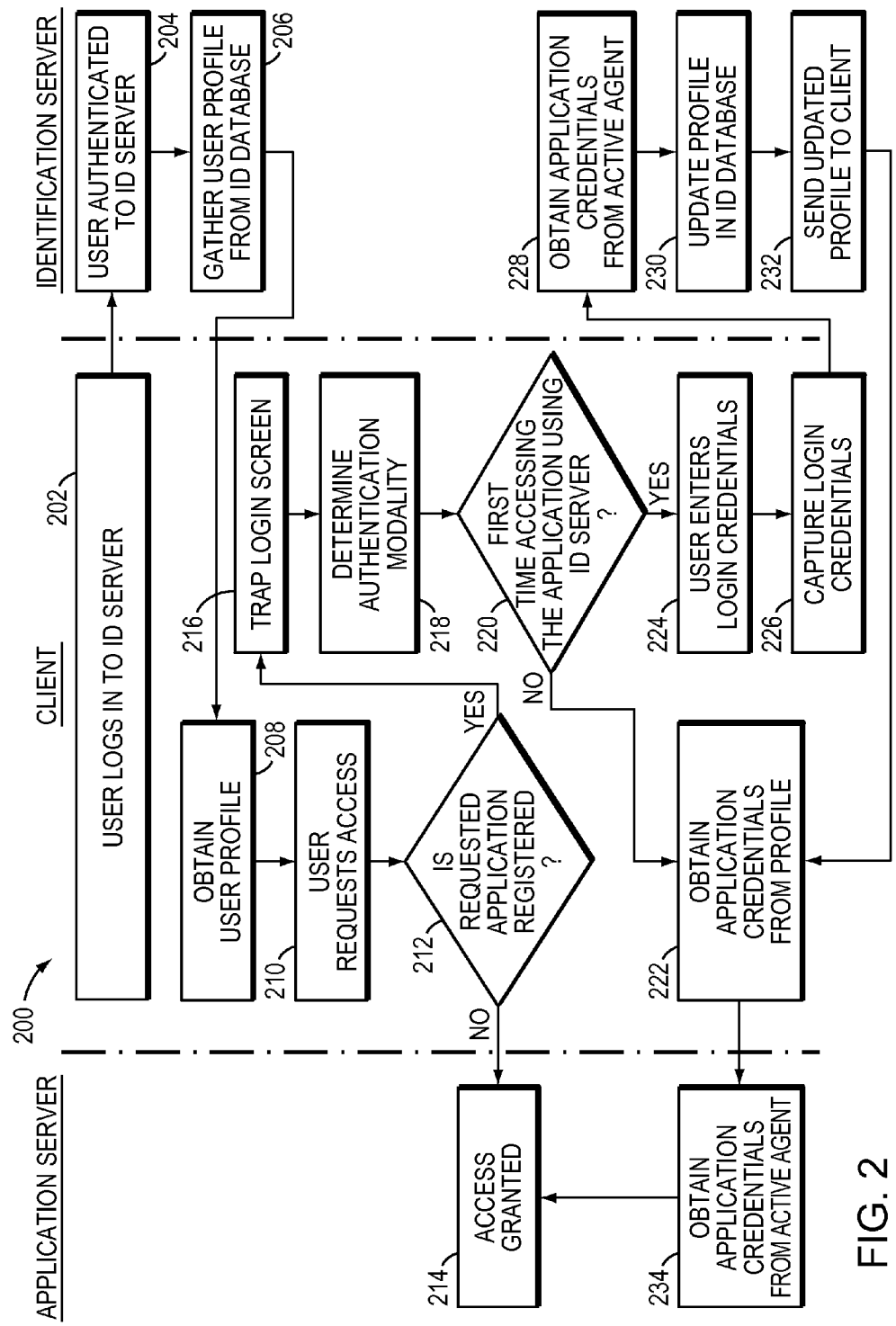
FIG. 2 is a flow diagram of a process to authenticate a user to one or more applications using a client-resident profile and an identification server in accordance with the invention.

With an individual registered in the identification server 108 (i.e., with user-identifying information, an alias, and authentication information obtained and stored in the identification database module 124), a process 200 as shown in FIG. 2 may be used to authenticate a user to one or more applications without the user having to provide authentication information for the application(s) each time the user requests access. The user 102 of the client 104 logs into the identification server 108 (step 202) by providing one or more of a password, user identification code, biometric data, or the like. The identification server 108 authenticates the user (step 204) and retrieves the user profile 134 associated with the user 102 from the identification database module 124 (step 206). The identification server 108 sends the user profile 134 to the client 104 (step 208) for future use by the active agent 132.

In one version of the above-described embodiment, the user profile 134 remains on the client 104 after the user 102 terminates each session. In this case, the user profile 134 that is sent from the identification server 108 automatically overwrites the user profile 134 from the previous session. More preferably, however, the user profile 134 is deleted upon termination of each session for security purposes. In either case, once the update data arrives from the identification server 108 and is stored in the user profile 143 on the client 104, the active agent 132 uses the data contained in the user profile 134 to automatically register the user 102 with the application 114 without the user needing to perform any authentication procedures.

The access to a service (e.g., execution of an application program, access to a financial or medical database, access to an electronic vault with which the user is associated, download of data and/or application program and the like) is provided by the application server 106. As illustrated in the present embodiment, the user of an application requests access to the application by navigating to a login page or to an access screen for the application (step 210). The active agent 132 recognizes the user action as a request to access an application and determines if the application is a restricted access application (decision step 212). If the active agent 132 determines that, based on the data stored user profile 134 and described in detail above, the application is not restricted, access is granted (step 214).

Alternatively, if the active agent 132 determines that the requested application is a restricted-access application, the active agent 132 traps the login or access screen (step 216). The login or access screen may be trapped by, for example, querying an operating system message queue, initiating random screen captures, attaching an object to an Internet browser to intercept HTTP messages, connecting to a terminal emulator using the HLLAPI protocol, or recognition of HTTP addresses, among other methods. In conjunction with trapping the login screen, the active agent 132 queries the user profile 134 to determine the authentication modality used to gain access to the application (step 118). The active agent 132 further determines whether the user 102 has previously accessed the application being requested (decision step 220). If in one instance, the user 102 has previously accessed the application being requested, the active agent 132 obtains the application credentials (step 222) from the user profile 134, completes the login form or access screen, and transmits (step 234) the credentials to the application server 106. The application server 106 may then grant the user access to the application (step 214).

For example, in the case of a web application, the active agent 132 may recognize, based on an entry in the user profile 134, an HTTP address entered by the user into the location field of a client-resident Internet browser application. If, for example, the resulting web page includes form fields requiring user authentication, the active agent 132 queries the user profile 134 for the data records corresponding to that address, which include the data necessary to complete the form. Recognizing the data as corresponding to the requested web page, the active agent 132 automatically completes the form and sends the data to the application server 106. Thus, the user gains access to the application without having to enter her authentication information and can perform the desired functions within the application.

Alternatively, for network-based applications accessed via application server 106, the active agent 132 monitors the operating system message queue, recognizing messages corresponding to the requested application (based on entries in the user profile 134) and taking appropriate action (also as specified entries in the user profile 134), e.g., logging the user in or, as described below, enforcing restrictions.

In another instance of the current example, a user 102 may be requesting access to an application for the first time. In such a case, the identification server 108 may not have the correct authentication credentials for the user 102, and therefore the active agent 132 will not be able to complete the login screen. Therefore, the user 102 manually enters her authentication credentials (step 224) using one or more input devices 126. Using one or more of the methods described above, the active agent 132 captures the authentication credentials (step 226), and if the login is successful, sends the information to the identification server 108. The identification server 108 receives the authentication credentials for the newly requested application (step 228), and sends them to the identification database module 124. The identification server 108 then updates the user profile (step 230) in the identification database module 124, and sends the updated user profile 134 back to the client 104. The active agent 132 then obtains the application credentials (step 222) from the updated user profile 134, completes the login form or access screen, and transmits (step 234) the credentials to the application server 106. The application server 106 may then grant the user access to the application (step 214).

In some circumstances, the login process may not be successful. This may be due to a user manually changing his application password, a password expiring, an administrator resetting the password, or other application-specific event. In such cases, the active agent 132 recognizes the screens or messages representing an unsuccessful login sent from the application server 106 to the client 104. The application 106 can then send screens to the client 104 instructing the user 102 to reset his password, PIN, or other authentication data. The active agent 132 captures the reset process, updates the user profile 134 with the new data, and sends the new password to the identification server 108 where it is stored in the database module 124. The identification server 108 can then send the user profile 134 back to the client 104 for use during the current and/or future sessions. In some versions, the active agent 132 can also automatically generate a random password for the user 102 such that the user 102 is unaware of the password-reset process.

Figure 3:
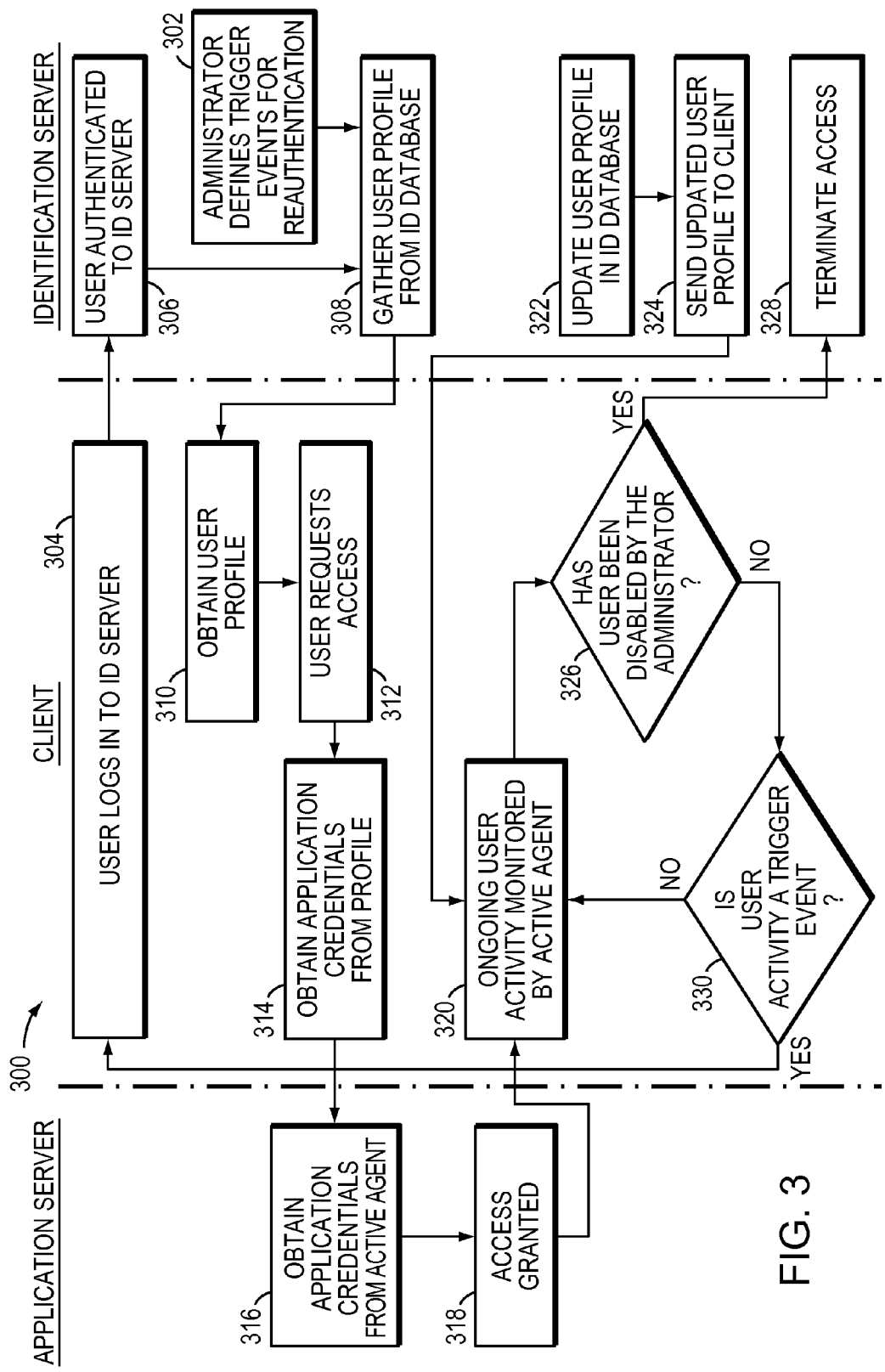
FIG. 3 is a flow diagram of a process to disable a user from one or more applications and define events that require a user to re-authenticate themselves using a client-resident profile and an identification server in accordance with the invention.

With an individual registered in the identification server 108 (i.e., with user-identifying information, an alias, and authentication information obtained and stored), a process 300 as shown in FIG. 3 may be used to automatically withdraw a user's access rights to an application and to define events that require a user to be re-authenticated. Prior to a user 102 being logged into the identification server 108, an administrator may define trigger events (step 302) which, when recognized by the active agent 132, may terminate access, or require re-authentication, to the identification server 108. A trigger event can be a particular function or screen accessed by a user, a broken communications link, inactivity of the user, a signal from the server sent on a periodic or random basis, expiration of an application password, or the like. Furthermore, trigger events can be set globally for all users and all applications, for individual users across all registered applications, for particular applications, for certain modules within applications, or for entries in selected fields on particular screens. The trigger events can be stored in the identification database module 124 as part of a user profile 134. When a user 102 logs into the identification server 108 (step 304), his authentication credentials are authenticated (step 306) by the identification server 108. The identification server 108 queries the identification database module 124 and gathers the data necessary to construct the user profile (step 308). The active agent 132 residing on the client obtains the user profile data from the identification server 108 and stores the user profile on the client 104 (step 310).

Continuing with the example above, a user 102 requests access (step 312) to an application server 106. The active agent 132 retrieves the authentication credentials (step 314) from the user profile 134 residing on the client 104, and transmits the credentials to the application server 106. The application server 106 receives the application credentials (step 316) from the client 104, and grants the user 102 access to the requested application (step 318). Once granted access to the application server 106, the user 102 may execute functions (step 320) within the application based on the data stored in his user profile 134.

Data specifying restrictions is stored in the user profile 134, and once again, the active agent 132 constantly monitors the user's activities (by trapping screens, fields within a screen, etc.) and permits execution only of these actions consistent with the restrictions.

For example, a first user may be restricted to view only particular screens within an application, may only have read access to data on particular screens, may only be able to update a single field on a screen, or may be blocked from viewing certain web pages within a permitted web site. Conversely, a second user may have full administrative rights to an application, and/or may have rights to view any or all web pages within a particular web site. Therefore, the active agent 132 may restrict the first user's actions based on the information in her user profile (preventing transmission of "save" commands in conjunction with read-only data or requests for disallowed web pages), while imposing no restrictions on the functions the second user may perform, or data she can enter and update.

In one particular version, the invention permits an administrator to revoke a user's access to one or more applications 114 registered with the identification server 108, even in the case where the user 102 is currently logged into the application(s). Referring again to FIG. 3, the active agent 132 may constantly monitor the ongoing user activity (step 320) for activities corresponding to entries in the user profile 134 currently residing on the client 104. An administrator may then update one or more user profiles 134 (step 322) with instructions that the user's access rights are to be revoked. The updated user profile may then be sent (step 324) to the client 104 for use by the active agent 132 as it monitors ongoing user activity, overwriting the previous user profile 134. If the active agent 132 receives notice the user's access rights have been revoked (decision step 328), the active agent traps the user activity and terminates access (step 326) to the identified application(s) 106.

A user 102 may also be required to re-authenticate himself to the identification server 108 based on one or more trigger events. A re-authentication trigger event may be, for purposes of illustration, a particular function initiated by a user or an administrator, a broken communication link, a screen or web page requested by a user, inactivity of the user, passage of some period of time, revocation of access rights, the execution of a particular sequence of functions, elapsed time within an application, the receipt of web content, or a signal from the server sent on a periodic or random basis. The trigger events can be stored in the identification database module 124 as part of a user profile 134, and are sent to the client 104 when a user 102 logs into the identification server 108. As the user 102 performs ongoing activities within applications, the active agent 132 can determine if the user's access privileges have been revoked (decision step 328). If a user's access privileges have not been revoked, the active agent 132 can then determine if a re-authentication trigger event has occurred (decision step 330). If, in one case, no re-authentication trigger event has occurred, the user 102 may continue to use the application(s) 106 without interruption. If, however, a re-authentication trigger event has occurred, the user activity can be interrupted and the user may be presented with a login screen (step 304) for the identification server 108.

Figure 4:
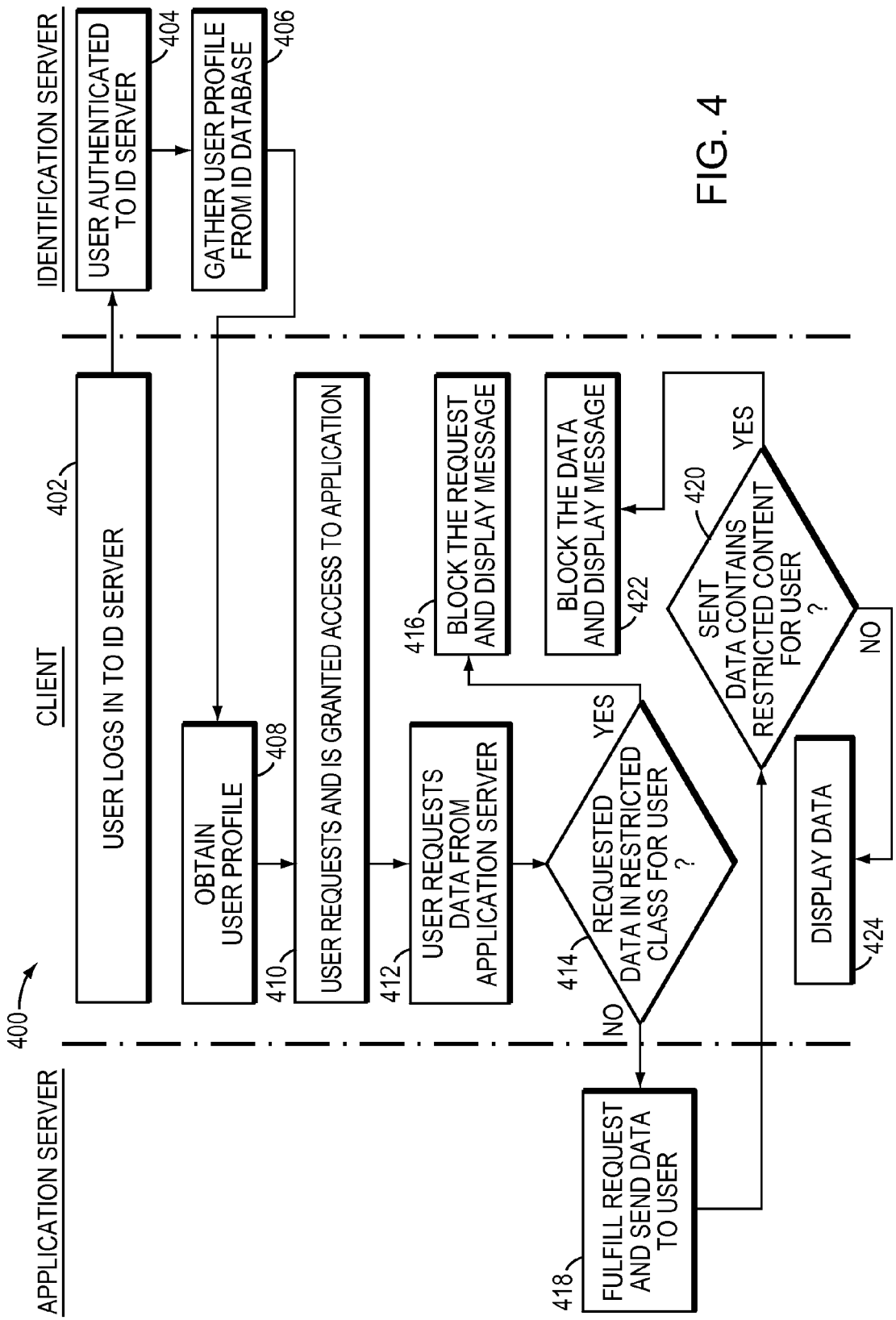
FIG. 4 is a flow diagram of a process to filter data and data requests of users within one or more applications using a client-resident profile and an identification server in accordance with the invention.

FIG. 4 illustrates the filtering of user requests and data to be presented to a user 102. As discussed above, the user of an application requests access to the application by navigating to a login page for the identification server (step 402). The identification server 108 authenticates the user 102 (step 404), retrieves the user profile 134 for the user (step 406) from the identification database module 124, and sends the user profile 134 to the client 104, where it is obtained (step 408) and stored by the active agent 132. A user 102 may now request access (step 410) to one or more applications 106 via the identification server 108, according to the process described above and illustrated in FIG. 2.

Additionally, the user profile 134 preferably contains a list of conditions, triggers and actions for the user 102. A condition may correspond to a setting of a particular data field (e.g., "Name=Smith"), content contained in a screen (i.e., keywords), a particular screen being displayed (identified, for example, by its Uniform Resource Locator), a particular sequence of screens being displayed, etc. A trigger is associated with a set of conditions and is activated when the set or a subset of the conditions are satisfied. For example, one trigger may be activated when three specific conditions are met; another trigger may be activated when any four of seven specific conditions are met; another trigger may be activated when some particular combination of conditions are satisfied. A single action or multiple actions may be performed when a trigger is activated. A non-exhaustive list of example actions includes the blocking of a requests; the greying out of data; reporting activity to an administrator; locking a user out of an application; toggling a flag variable to satisfy a condition; etc.

Once access is granted to an application 114, a user 102 may make a request for information (step 412) from the application 114 residing on the application server 106. In one embodiment of the invention, the user's requests are monitored by the active agent 132 and compared (decision step 414) to the content restriction information stored in the user profile 134. The basis for comparison may be data fields queried (e.g., "salary information"), data contained in the query (e.g., "information pertaining to John Doe"), URLs requested, type of report requested, etc. These bases of comparison preferably correspond to conditions found in the user profile 134. If the request falls in a restricted class for the user 102, then an action is performed in accordance with the user profile 134. For example, the request may be blocked by the active agent 132 and a message displayed to the user 102 (step 416). Alternatively, if only a portion of the request is in a restricted class for the user 102, then a portion of the request may be permitted. In one version, the active agent 132 may note the restricted request and report it to an administrator. If the request is permissible for the user 102, then no action need be taken and the active agent 132 allows the client 104 to send the request to the application server 106.

If the active agent 132 allows a user's request to be sent to the application server 106, then the application 114 performs the requested function and returns the data to the user's client machine 104 (step 418). The active agent 132 may compare the returned data against the content restriction information in the user's profile 134 (decision step 420). The basis for comparison may be data fields of the reply (e.g., "salary information"), data contained in the reply (e.g., all instances of "John Doe"), particular screens of data (identified, for example, by Uniform Resource Locators or header information), particular sequences of screens of data, etc. These bases of comparison preferably correspond to conditions found in the user profile 134. For example, if the reply contains data organized in data fields of "Employee," "Hiring Date," and "Salary", the user profile 134 may indicate the user 102 is not permitted to view any salary information (e.g., the user profile condition indicates "Data Field=Salary"), or any information relating to John Doe (e.g., "Employee=John Doe"), or any salaries for particular employees, or any salaries over $100,000. As another example, if the reply contains data not identified by data fields, such as in a plain HTML page or an emulated mainframe terminal screen, then the user profile 134 may contain particular keywords, which the active agent 132 may search for while performing the comparison step 420. Additionally, if the reply contains data identifiable by location on screen, such as an emulated mainframe terminal screen where a particular type of information is always displayed on the same portion of the screen, then the active agent 132 may filter content based on those screen locations.

If the returned data contains restricted content for the user 102 (i.e., sufficient profile conditions are satisfied that a trigger is activated), then the active agent 132 performs an action as specified by the user profile 134, preferably blocking the data while displaying a message to the user 102 (step 422). In one version, only the restricted data is blocked from the user's view, by way of "xing out" or "greying out" the restricted data on the user's screen. In another version, the client 104 displays no data to the user 102, but instead the user 102 receives a message that the reply to his request contains restricted data. In another version, the active agent 132 may note the restricted data and report it to an administrator. If the data contains only permissible content for the user 102, then the active agent 132 allows the data to be displayed on the client machine 104 to the user 102 (step 424). In another version, particular menu items or buttons in an application may be disabled for the user 102 so that the functions corresponding to those menus items and buttons (for example, the ability to cut and paste text) cannot be activated.

Thus, the active agent 132 may be configured to filter content by monitoring user requests transmitted from the client, data received by the client, or both. The restrictions may be negative (specifying material the user is prohibited from accessing), positive (specifying material the user is permitted to access), or a combination.

In the embodiments of the invention described above, the software may be configured to run on any computer or workstation such as a PC or PC-compatible machine, an Apple Macintosh, a Sun workstation, etc. In general, any device can be used as long as it is able to perform all of the functions and capabilities described herein. The particular type of computer or workstation is not central to the invention.

The identification server 108 may include a network interface continuously connected to the network 110. In a typical implementation, the network interface and the other internal components of the identification server 108 intercommunicate over a main bi-directional bus. The main sequence of instructions effectuating the functions of the invention and facilitating interaction among clients 104, servers 106 and 108, and the network 110 can reside on a mass storage device (such as a hard disk or optical storage unit) as well as in a main system memory during operation. Execution of these instructions and effectuation of the functions of the invention is accomplished by a central-processing unit ("CPU").

A group of functional modules that control the operation of CPU and effectuate the operations of the invention as described above can be located in system memory. An operating system directs the execution of low-level, basic system functions such as memory allocation, file management, and operation of mass storage devices. At a higher level, a control block implemented as a series of stored instructions, responds to client-originated queries by selecting and/or assembling, and then transmitting, appropriate data.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of controlling access via a client computer to data provided by a network-based application, the method comprising the steps of:
   receiving, at the client computer from an identification server, data-restriction information based on a user's identity;
   on the client computer, following retrieval of the data-restriction information, monitoring a message queue of an operating system executing on the client computer
   recognizing a message sent by the user and intended for the network-based application;
   searching the message for a keyword, data field, or screen present in the data-restriction information; and
   based on a result of the search of the message, permitting or blocking direct transmission of the message from the operating system to the network-based application or, if the network-based application communicates with an application resident on the client computer, blocking transmission of the message from the operating system to the application resident on the client computer.

2. The method of claim 1 wherein according or restricting user access to the application comprises restricting execution of the operating system instructions in accordance with the data-restriction information, thereby limiting display of the retrieved external data.

3. The method of claim 1 wherein the data-restriction information is stored on the identification server and wherein the identification server is in communication with the client computer over a network.

4. The method of claim 3 further comprising the step of authenticating the user by:
   storing, on the identification server, a user profile comprising the data-restriction information and a reference set of biometric data identifying the user;
   receiving, at the client computer, biometric data from the user;
   transmitting the received biometric data from the client computer to the identification server over the network; and
   if the received biometric data sufficiently matches the reference biometric data, confirming the identity of the user and transmitting the data-restriction information to the client computer.

5. The method of claim 1 wherein the data-restriction information specifies web pages the user is permitted to request.

6. The method of claim 1 wherein the data-restriction information specifies web pages the user is prohibited from requesting.

7. The method of claim 1 wherein the data-restriction information limits application screens the user is permitted to view.

8. The method of claim 1 wherein the data-restriction information limits data on a screen a user is permitted to view.

9. The method of claim 1 further comprising:
   monitoring data sent from the network-based application as it is received by the client computer
   searching the received data for a keyword present in the data-restriction information; and
   limiting the user's access to the data in accordance with a result of the search of the received data.

10. The method of claim 1 further comprising permitting or blocking transmission of additional messages to a plurality of network-based applications utilizing a plurality of different communications protocols.

11. The method of claim 1 further comprising capturing a screen image sent to an output device and searching the screen image for a keyword, data field, or screen present in the data-restriction information.

12. The method of claim 1 wherein the application resident on the client computer is a web browser.

13. A system for controlling access via a client computer to data provided by a network-based application, the system comprising:
   a communications module on the client computer for communicating with a computer network for receiving thereover, from an identification server, data-restriction information based on a user's identity;
   a storage device on the client computer for storing the data-restriction information; and
   an active agent operable on the client computer for (i) monitoring a message queue of an operating system executing on the client computer and recognizing a message sent by the user and intended for the network-based application, (ii) searching the recognized message for a keyword, data field, or screen present in the data-restriction information, and (iii) based on a result of the search, permitting or blocking transmission direct of the message from the operating system to the network-based application or, if the network-based application communicates with an application resident on the client computer, blocking transmission of the message from the operating system to the application resident on the client computer.

14. The system of claim 13 wherein the data-restriction information specifies web pages the user is permitted to request.

15. The system of claim 13 wherein the data-restriction information specifies web pages the user is prohibited from requesting.

16. The system of claim 13 wherein the data-restriction information limits application screens the user is permitted to view.

17. The system of claim 13 wherein the data-restriction information limits data on a screen a user is permitted to view.

18. The system of claim 13 further comprising, on the client computer, a biometric input device for receiving, at the client computer, biometric data from the user, the communications module transmitting the received biometric data from the client computer to the identification server over the computer network.

19. The system of claim 13 wherein the active agent monitors data sent from the network-based application as the sent data is received by the client computer, searches the received data for a keyword present in the data-restriction information, and limits the users' access to the data in accordance with the search of the received data.

20. The system of claim 13 wherein the active agent is further configured for permitting or blocking transmission of additional messages to a plurality of network-based applications utilizing a plurality of different communications protocols.

21. The system of claim 13 wherein the active agent is further configured for capturing a screen image sent to an output device and searching the screen image for a keyword, data field, or screen present in the data-restriction information.

22. The method of claim 13 wherein the application resident on the client computer is a web browser.

23. A method of controlling access via a client computer to a plurality of network-based applications, the method comprising the steps of:

receiving, at the client computer from an identification server, data-restriction information based on a user's identity;

on the client computer, following retrieval of the data-restriction information, constantly monitoring the user's activities by examining at least a portion of a screen of the client computer and a message queue of an operating system executing on the client computer;

recognizing, in the user's activities, messages sent by the user and intended for at least one of the plurality of network-based applications, wherein each network-based application requires individual authentication;

searching the message for a keyword, data field, or screen present in the data-restriction information; and based on a result of the search of the message, permitting or blocking direct transmission of the message from the operating system to one of the network-based applications or, if one of the network-based applications communicates with an application resident on the client computer, blocking transmission of the message from the operating system to the application resident on the client computer.

* * * * *